May 21, 1940.　　　C. W. VAN RANST　　　2,201,252

MOTOR VEHICLE

Original Filed July 21, 1934

INVENTOR.
Cornelius W. Van Ranst
BY Tibbetts & Hart
ATTORNEYS

Patented May 21, 1940

2,201,252

UNITED STATES PATENT OFFICE 2,201,252

MOTOR VEHICLE

Cornelius W. Van Ranst, Detroit, Mich., assignor to Packard Motor Car Company, Detroit, Mich., a corporation of Michigan Original application July 21, 1934, Serial No. 736,292. Divided and this application August 17, 1938, Serial No. 225,409

5 Claims. (Cl. 98—2)

This invention relates to motor vehicles and more particularly to a construction for ventilating vehicle bodies, this application being a division of my Pat. No. 2,146,866, issued February 14, 1939.

An object of the invention is to produce a novel and improved construction for motor vehicles by means of which an adequate supply of fresh air will be constantly circulated through the body without the production of drafts.

Another object of the invention is to provide a vehicle body roof structure with air ejector means that does not detract from the appearance of the body.

With the above and other objects in view, the invention consists of a construction embodying the novel and improved features hereinafter described and particularly pointed out in the claims, the advantages of which will be readily understood by those skilled in the art.

The invention will be clearly understood from the accompanying drawing illustrating a construction embodying the several features of the invention in its preferred form and the following description of the construction therein shown.

Figure 1:
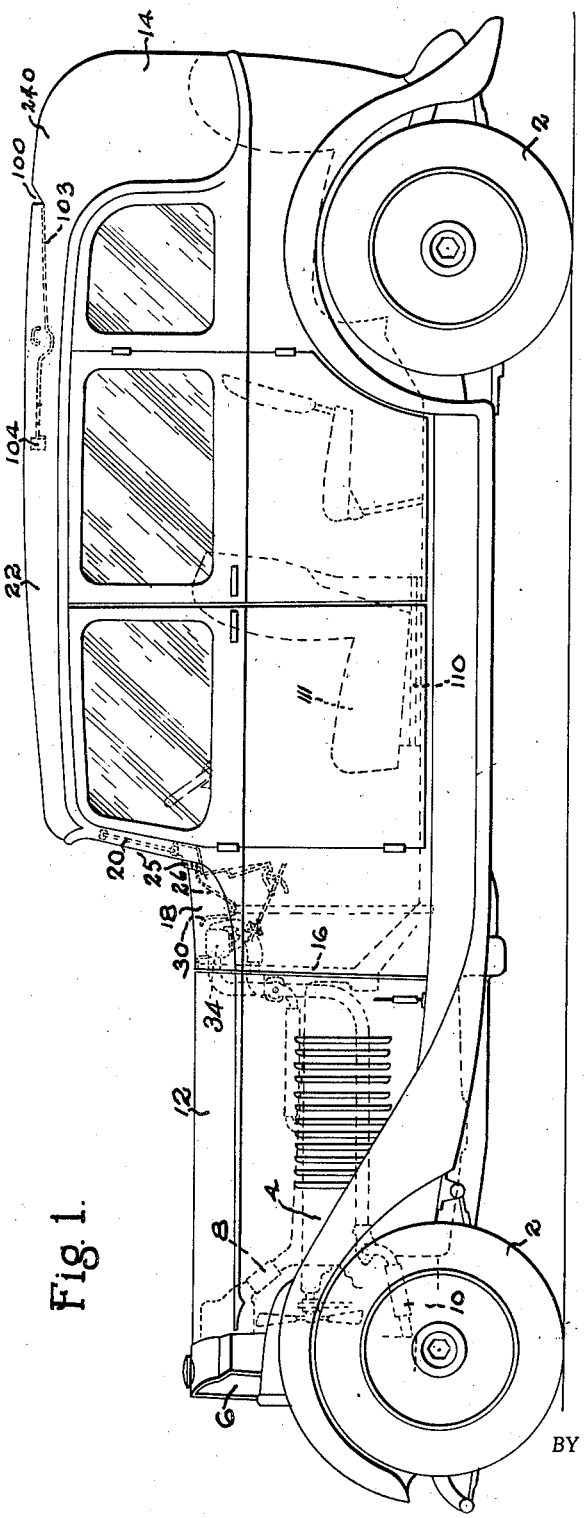
Fig. 1 is a side elevational view illustrating a motor vehicle having a body construction embodying the invention applied thereto.
Figure 2:
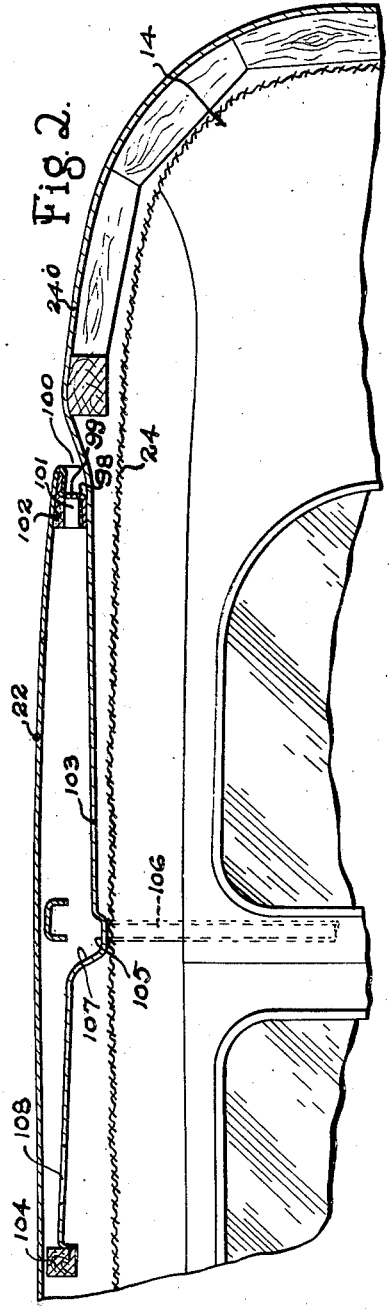
Fig. 2 is a detailed view in vertical section of the vehicle taken through the roof portion of the body illustrating the ventilation means for the interior of the body.

The invention is illustrated in this application as applied to a motor vehicle comprising a chassis supported upon wheels indicated at 2, an internal combustion engine 4, a radiator 6 connected with the water jacket of the engine by means of pipe connections 8 and 10, a hood 12 enclosing the engine, a body 14 having a dash 16, a cowl 18, and a windshield 20. The body is provided with a top comprising a roof 22 and having a headlining 24 of porous fabric spaced from the roof.

In order to admit a supply of fresh air to the space within the cowl, the rear portion of the cowl adjacent the windshield is provided with a series of slots 25. Within the cowl and extending forwardly from the slots 25 is an air directing plate 26 having an upwardly extending deflector plate 30. Air deflected by the plate passes downwardly past a heater indicated at 34 and thence into the interior of the vehicle body.

Air enters the body under pressure through the cowl slots 25 and is drawn from the rear top portion of the body by Venturi action. In this manner an efficient circulation of fresh air through the body is maintained.

The roof 22 and the back body panel 240 are associated to form a transverse air outlet opening or slot 100 therebetween that communicates with the body interior. The rear end of the roof has an extension 98 bent to extend forwardly under the roof cross brace 102. Such extension has openings 99 that register with openings 101 in the brace 102 to form air passage means between the body interior and slot 100. The roof and the back panel are fixed to the top cross braces of the body frame in any suitable manner.

In order to prevent the entrance of water into the body through the slot 100 and openings 99 and 101, the construction shown comprises a deflector plate 103 extending forwardly from the front of the rear panel adjacent slot 100. This deflector plate extends forwardly between the headlining and the roof and has its front end secured to a cross roof brace 104. The plate 103 is inclined downwardly from a point adjacent the cross braces 102 and 104 and is formed with a depressed portion 105 extending across the body forming a pan or trough from which the water is drained by tubes 106 that extend downwardly through the body. At the front of the pan is a sharply inclined upwardly extending portion 107 that prevents water from passing forwardly thereof. The forward part of the plate is formed with openings 108 through which the air passes from the body interior below the plate.

During the movement of the vehicle, air within the body is drawn outwardly through openings 108, 101, 99 and through slot 100 by suction or ejector action. The air within the body passes upwardly through the headlining substantially throughout the length of the body into the space between the headlining and the roof and passes through the openings 108 above the plate 103, and then rearwardly over the plate through the openings 101 and 99 where it is discharged through the slot 100 to the exterior of the body.

Thus, through the pressure of the air in front of the windshield which forces air into the body through slots 25 and the ejector action at the slot 100 which draws the air outwardly from the body, a constant circulation of air is maintained through the interior of the body while the vehicle is in motion. This circulation may be controlled by regulating the air flow past the heater in any suitable manner. In order to facilitate the circulation of the air in the body, openings 110 are formed underneath the front seat 111 to connect the space in front of said seat with the space at the rear thereof.

With the above construction a constant supply of fresh air is maintained in circulation through the body of the vehicle.

It is to be understood that the invention is not limited to the particular construction and arrangement of parts of the illustrated embodiment of the invention, but that the construction shown and described is merely illustrative of the invention and that the invention may be embodied in other forms within the scope of the claims.

What is claimed is:

1. A vehicle body comprising a frame having top cross braces, a roof fixed on the cross braces having a reversely bent apertured rear end and a rear panel fixed on the frame and extending forwardly in spaced relation beneath the roof, said forwardly extending portion of said rear panel having an air passage therethrough communicating with the interior of the body and having its front end fixed to one of the frame cross braces, the rearmost cross brace of said frame structure associated with the roof having openings extending therethrough in a direction longitudinally of the vehicle body and adjacent the openings in rear end of the roof.

2. A vehicle body comprising a frame, a roof fixed on the frame, a rear panel fixed on the frame having a portion extending forwardly beneath the roof and in spaced relation relative thereto, said forwardly extending portion of said panel beneath the roof being depressed to form a trough, and a drain conduit associated with said trough portion of the rear panel extension.

3. In a motor vehicle construction comprising a body having a foraminous headlining through which air can pass from the interior of the body, a top spaced above the headlining and having an opening therein for the escape of air passing through the headlining, a plate extending forwardly from said opening between said headlining and said top, said plate being shaped to form a drain pan, and a drain conduit leading from said pan.

4. In a sheet metal vehicle body, a roof, a back panel, a back panel extension underlying the roof and forming therewith a chamber, said chamber having an inlet communicating with the interior of the body and an outlet leading to the exterior of the body, and a drain conduit leading from said extension.

5. In a motor vehicle body construction, a roof, a rear panel, and a panel extension projecting forwardly beneath the roof and forming therewith an outlet passage for air from within the body, said extension being formed with a drain trough, and a drain conduit leading from the extension trough.

CORNELIUS W. VAN RANST.